US007099448B1

(12) United States Patent
Laniepce et al.

(10) Patent No.: US 7,099,448 B1
(45) Date of Patent: Aug. 29, 2006

(54) IDENTIFICATION OF PARTICIPANT IN A TELECONFERENCE

(75) Inventors: Sylvie Laniepce, Beny Bocage (FR); Delphine Charlet, Lannion (FR)

(73) Assignee: France Telecom, Paris (FR)

( * ) Notice: Subject to any disclaimer, the term of this patent is extended or adjusted under 35 U.S.C. 154(b) by 449 days.

(21) Appl. No.: 10/110,398

(22) PCT Filed: Sep. 25, 2000

(86) PCT No.: PCT/FR00/02648

§ 371 (c)(1),
(2), (4) Date: Apr. 12, 2002

(87) PCT Pub. No.: WO01/28214

PCT Pub. Date: Apr. 19, 2001

(30) Foreign Application Priority Data

Oct. 14, 1999 (FR) .................................. 99 12942

(51) Int. Cl.
*H04M 3/42* (2006.01)
*G06F 15/16* (2006.01)

(52) U.S. Cl. ................................ 379/202.01; 709/205
(58) Field of Classification Search .......... 379/202.01; 709/204, 205
See application file for complete search history.

(56) References Cited

U.S. PATENT DOCUMENTS

| 5,369,693 A | 11/1994 | Pillet et al. |
| 5,450,481 A | 9/1995 | Penzias |
| 5,483,588 A | 1/1996 | Mcfadden et al. |
| 5,668,863 A | 9/1997 | Bieselin et al. |
| 6,457,043 B1 * | 9/2002 | Kwak et al. ................. 709/204 |
| 6,687,358 B1 * | 2/2004 | Mark et al. ............ 379/202.01 |

FOREIGN PATENT DOCUMENTS

| EP | 0 374 943 | 6/1990 |
| EP | 0 515 241 B1 | 11/1992 |

OTHER PUBLICATIONS

Paper entitled, "Real Time Speaker Indexing Based on Subspace Method-Application to TV News Articles and Debate" by M. Nishida and Y. Ariki.
Paper entitled, "De La Reunion Telephone a La Conference Telephone" by Jean-Pierre Blin and Jean-Pierre Leblanc.

* cited by examiner

*Primary Examiner*—Wing Chan
*Assistant Examiner*—Thjuan P. Knowlin
(74) *Attorney, Agent, or Firm*—Lowe, Hauptman & Berner, LLP (57) ABSTRACT

A contributor who is one of a number of participants divided into groups at telephone terminals is identified by recognizing the contributor voice during a teleconference managed by a conference device connected to the terminals. After the voice of the contributor received by the conference device is identified, an identifier of the identified contributor is broadcast from the conference device to the terminals and reproduced at the terminals. The contributor is introduced to the other participants, automatically or on demand, for example by a voice or visual message including the contributor name. The conference device can be included in one of the terminals; for example, the identifier identifies a contributor other than the regular user of a communicating telephone or mobile radio telephone.

15 Claims, 5 Drawing Sheets

IDENTIFICATION OF PARTICIPANT IN A TELECONFERENCE

REFERENCE TO RELATED APPLICATION

This application is a 371 national stage filing of the PCT International Application No. PCT/FR00/02648 filed Sep. 25, 2000, which is based on the French Application No. 99-12942 filed Oct. 14, 1999.

BACKGROUND OF THE INVENTION

1—Field of the Invention

The present invention relates to voice teleconferences, in particular telephone conference calls, set up between at least two groups of remote participants.

It relates more particularly to recognizing the voice of a contributor during a teleconference independently of the content of their contribution in order for the other participants in the teleconference to identify the contributor. In other words, it is a question of answering the following question during a teleconference: "Which participant is speaking or has just spoken among all the participants ?".

2—Description of the Prior Art

Voice identification, also known as speaker indexing, consisting of recognizing the identity of a speaker in a signal comprising mixed speech channels of several participants is disclosed in the paper "REAL TIME SPEAKER INDEXING BASED ON SUBSPACE METHOD—APPLICATION TO TV NEWS ARTICLES AND DEBATE" by M. Nishida and Y. Ariki, Labs—5th ICSLP, Sydney, Australia, December 1998.

According to the above paper, a reference voice model is created for each speaker beforehand. Then, to recognize the voice of a speaker, for example the voice of a participant in a televised debate, the signal of the mixed channels relating to the voices of the participants is divided periodically into voice sections. The distances between each voice section and the voice models are compared and only the lowest distance is selected, provided that it is higher than a threshold. The speaker corresponding to the shortest distance is therefore identified as the contributor for the voice section concerned.

However, in the configuration described in the aforementioned paper, a contributor can be recognized only in mixed voices coming from only a small number of persons who are physically close together. As the number of participants increases, the performance of this contributor identification method deteriorates.

U.S. Pat. No. 5,668,863 describes a system for recording and reproducing an audio conference where the participants gather at telephones beforehand, with one participant per telephone. The system records beforehand audio data blocks each approximately 4 seconds in duration, in order to be able to identify the speakers and add them to a list of speakers if this has not already been done. To identify a speaker during subsequent reproduction of the audioconference, and not immediately, in real time, during the conference, i.e. to identify a participant who is actually speaking, the system identifies the source of the speech, to be more precise the line interface in the system that serves the telephone of the participant, in order to transmit the spoken name of the participant.

The above audio conference recording and playback system does not distinguish between the voices of several participants grouped at the same telephone or telephone terminal and is used after recording the audioconference, and thus with no identification of contributor during the audioconference.

OBJECT OF THE INVENTION

The present invention aims to identify a contributor from several groups of participants in a teleconference who are far apart, i.e. groups located at terminals that are far apart, in order for each group to be able to answer more accurately the question "who is speaking?". The invention therefore provides a solution for introducing contributors in a teleconference with a large number of participants, eliminating all confusion as to their identity.

SUMMARY OF THE INVENTION

Accordingly, a method of identifying a contributor among participants divided into groups at telephone terminals during a teleconference managed by means of a conference device connected to the terminals via transmission links, is characterized in that it comprises, after identification of the voice of the contributor received over the links by the conference device, the steps of:

broadcasting an identifier of the identified contributor over the links from the conference device to the terminals, and reproducing the identifier of the contributor at the terminals.

Thanks to the invention, the identity of contributors is indicated to all the participants during the teleconference and as and when they take the floor.

The identifier of the contributor includes at least the name of the participant and can be preferably complemented by at least one designation of the group to which he or she belongs or the name of the contributor company, or any other information useful to the participants for identifying the contributor. The identifier of the contributor can be obtained by speech recognition in the conference device after the latter has analyzed a learning phrase containing the identifier spoken by the participant and constructed a voice model of the identifier that has been verified by the participant. The identifier can also be entered via a terminal keyboard for use in subsequent voice recognition.

In the event of rapid conversational exchanges, which can cause difficulties in voice identification, the invention provides for the identifier is broadcast to the terminals only in response to requests sent therefrom to the conference device.

According to a first variant, the identifier of the contributor is broadcast in the form of a voice message intercut with or superimposed on participant voice signals on the links and is reproduced acoustically by the terminals. According to a second variant, the identifier of the contributor is broadcast in the form of a signaling message on the links and is reproduced visually in the terminals by displays or screens thereof.

In some applications, the conference device, i.e. the main functions thereof, can constitute an improved conference bridge, or can be included in one of the terminals, or in a private telephone exchange serving the terminals.

For example, during a telephone call between two telephones or mobile radio telephones, a participant using one of the telephones equipped with the conference bridge knows the identity of the contributor as one of at least two participants using the other telephone.

According to another feature of the invention, preferably used with a large number of groups of participants, the identification of the contributor in the conference device includes the steps of:

looking for the most active one of the links on the receive side, identifying the group corresponding to the most active link on the receive side, determining the greatest similarity between a voice segment on the most active link and voice models of the participants in the identified group, and identifying as the contributor the participant corresponding to the greatest determined similarity.

Thanks to the above feature, the voice of a contributor is looked for in all the voices of participants in the identified group, not in the voices of all the participants at all the terminals, which makes contributor identification more reliable.

The step of looking for the most active link on the receive side can consist of looking for the largest average power of voice segments on the receive channels of the transmission links, provided that it is greater than a predetermined threshold.

If the greatest determined similarity is less than a predetermined threshold, the participant corresponding to the greatest determined similarity can be considered as not identified, an unknown-contributor message being then broadcast to the terminals.

The voice models of the participants are created and updated in the conference device not later than the beginning of the teleconference and are the result of voice analysis of a model sentence exceeding a predetermined minimum duration, preferably containing at least one participant identifier part.

The identification process can include a step of determining the similarity between the voice segment on the most active link on the receive side and a voice model representative of more than one participant taking the floor and preferably specific to the number of participants in the identified group, so that the conference device can broadcast a start-of-multiple speaking message to the terminals if the determined similarity is greater than a predetermined threshold.

The identification method can also include a step of determining the similarity between the voice signal on the most active link on the receive side and the voice model of a last contributor in order for the conference device not to broadcast any identifier or to broadcast the identifier of the last contributor to the terminals only periodically or only to particular terminals in response to requests sent therefrom to the conference device, if the similarity is greater than a predetermined threshold.

The invention also concerns a conference device which comprises means for periodically detecting the most active link on the receive side in order to identify the group corresponding to the most active link on the receive side, means for periodically comparing a voice segment on the most active link on the receive side with stored voice models of the participants belonging to the identified group in order to identify as the contributor the participant corresponding to the greatest similarity between the voice segment and the voice models, means for deriving an identifier of the identified contributor, and means for broadcasting the contributor identifier over the links to the terminals.

BRIEF DESCRIPTION OF THE DRAWINGS

Further features and advantages of the present invention will become more clearly apparent on reading the following description of several preferred embodiments of the invention, which description is given with reference to the accompanying drawings, in which.

DESCRIPTION OF THE PREFERRED EMBODIMENTS

The following detailed description of a teleconference system and its variants relate to a telephone conference call type teleconference set up between a plurality of telephone terminals $T_1$ to $T_I$, with $I \geq 2$. The teleconference is accessible by reservation or by subscription or immediately via a telephone conference call bridge PCT.

Around each terminal $T_i$ is gathered a group $G_i$ of participants $P_{i,1}$ to $P_{i,Ki}$, where $K_i$ is an integer specific to the group $G_i$ and at least equal to 1. For example, the terminal $T_i$ can be an audioconference table around which $K_i$ participants are seated, or more simply a telephone or mobile telephone.

Thus the minimum configuration of a teleconference in accordance with the invention consists of two groups $G_1$ and $G_2$, with one participant at terminal $T_1$ and two participants at terminal $T_2$.

The teleconference system further includes a terminal TO, coincident with the terminal $T_1$, such as a personal computer or a dedicated teleconference console, reserved to a teleconference organizer who manages, i.e. organizes, sets up, monitors and directs the teleconference, in particular in order to welcome the participants, register their identities and personal access codes, reserve a teleconference, filter channels and call participants during the teleconference, organize votes, etc. In the embodiment shown, the terminal TO is in communication with a local maintenance and assistance server SER connected to the conference bridge PCT.

Figure 1:
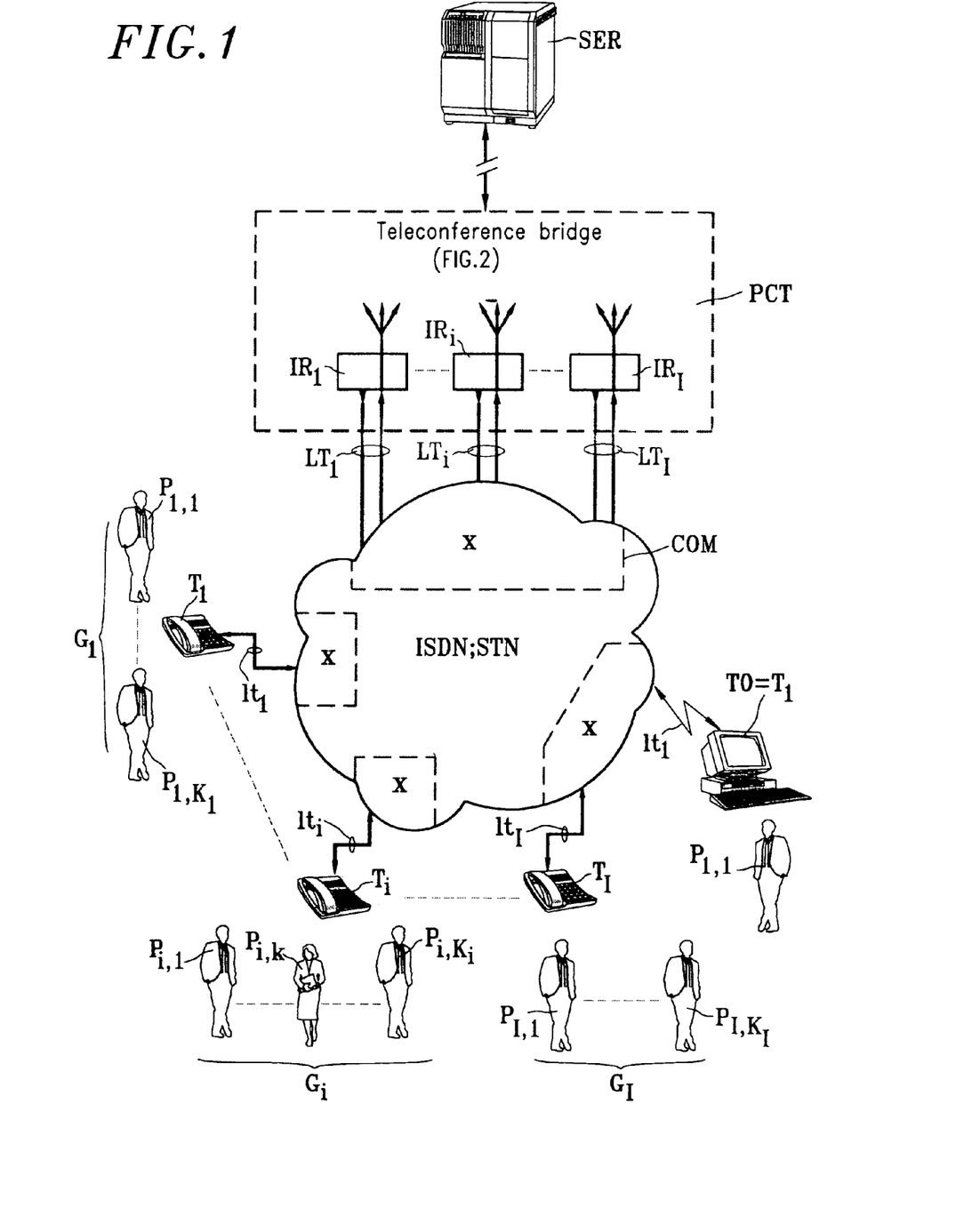
FIG. 1 is a schematic block diagram of a telephone conference call type teleconference system according to the invention.

In a first variant, the bridge PCT is connected to the terminals $T_1$ to $T_I$ by an integrated services digital network ISDN. For example, each terminal $T_i$, where i is from 1 to the integer I, is a digital terminal connected to a switch of the ISDN network by a telephone line $lt_i$ with two pairs of wires providing bidirectional basic rate access with two 64 kbit/s voice/data B channels and a 16 kbit/s signaling D channel, or bidirectional access with 30 or 23 64 kbit/s B channels and one 64 kbit/s signaling D channel if the terminal is a digital private automatic branch exchange (PABX), for example. An autonomous routing digital switch COM of the ISDN network serves the conference bridge PCT through a large number of telephone lines not less than I; in practice, a bridge can be served by several hundred telephone lines in order to handle a plurality of independent teleconferences simultaneously. In FIG. 1 it is assumed that to each line $lt_1$ to $lt_I$ corresponds an access line $LT_1$ to $LT_I$ to the bridge PCT, which lines can be multiplexed at the output and demultiplexed at the input of the associated switch COM.

In a second variant, the terminals $T_1$ to $T_I$ are analog terminals conventionally connected to the switched telephone network STN by two-wire telephone lines $lt_1$ to $lt_I$. Similarly, the conference bridge PCT is connected to the network PSTN by at least I two-wire analog telephone lines.

In a further variant, a terminal $T_i$ is a mobile radio telephone, for example a GSM, DCS 1800 or DECT telephone, connected to the network STN, ISDN by the corresponding fixed radio telephone network, or a private or public terminal in that kind of fixed network.

However, other variants combine the foregoing variants. Hereinafter, the conference bridge PCT is described interchangeably as if of the type with telephone lines $lt_1$ to $lt_I$ and $LT_1$ to $LT_I$ or of the ISDN, STN network type; with regard to identifying a participant in a teleconference call, the main modifications relate to the network interfaces $IR_1$ to $IR_I$ in the conference bridge PCT respectively connected to the telephone lines $LT_1$ to $LT_I$.

Regardless of the type of line $LT_i$, the main functions of the network interface $IR_i$ are to extract conventional telephone signaling and teleconference signaling coming from the terminal $T_i$ in the signal received by the line $LT_i$ by separating them from a participant voice signal and to insert telephone signaling and teleconference signaling addressed in particular to the terminal $T_i$ into the signal sent over the line $LT_i$ by mixing it with a voice signal.

Figure 2:
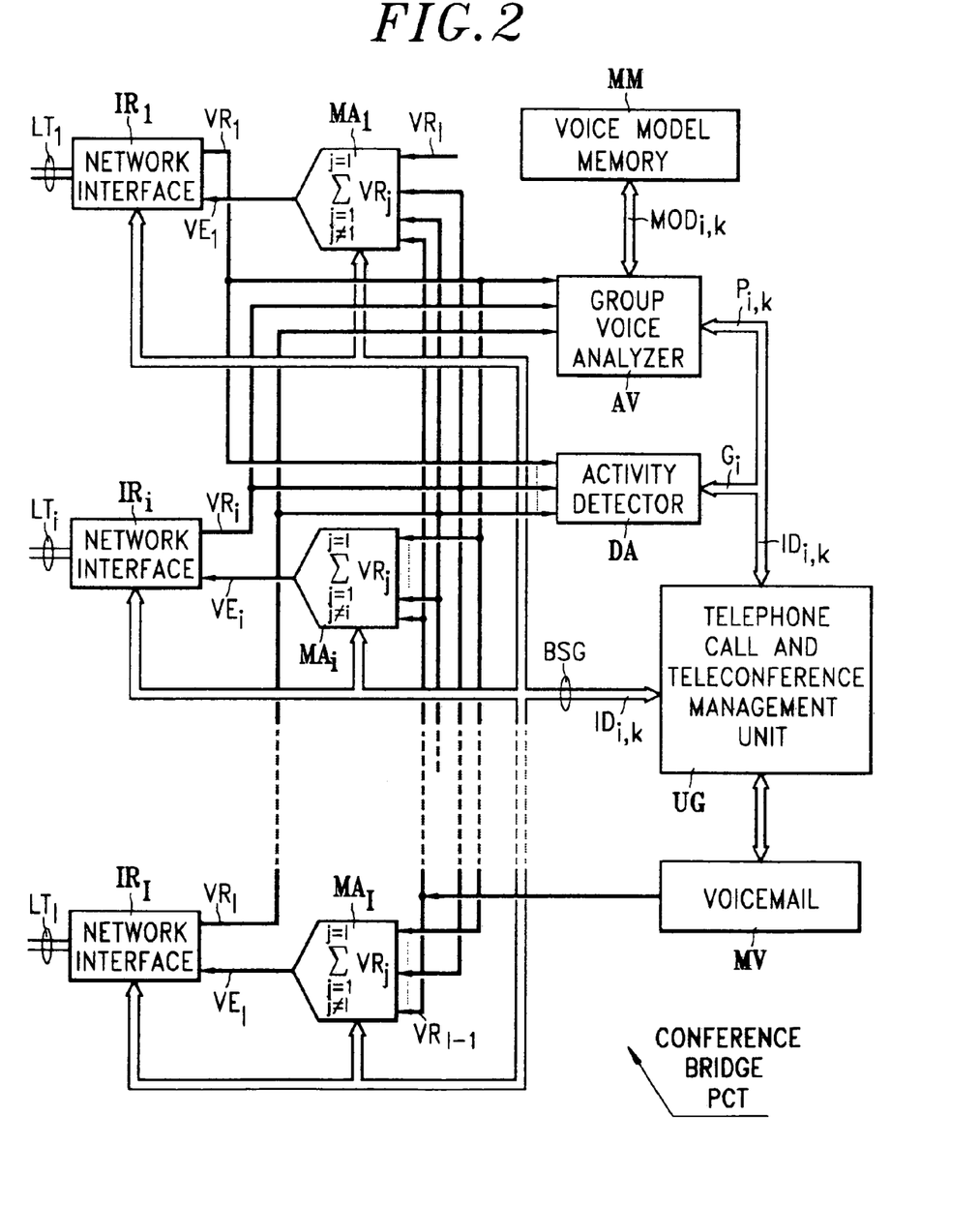
FIG. 2 is a schematic block diagram of a conference bridge included in the FIG. 1 system.

As shown in FIG. 2, a signaling bus BSG exchanges signaling extracted and to be inserted between the interfaces $IR_1$ to $IR_I$ and a telephone call and teleconference management unit UG.

A digital voice receive channel $VR_i$ connects the network interface $IR_i$ to the inputs of a line activity detector DA and a group voice analyzer AV. A digital voice send channel $VE_i$ connects the output of a respective audio mixer $MA_i$ to the network interface $IR_i$.

If the line $LT_i$ is a digital line, it supports at least one of the B channels and the D channel corresponding to those of the line $lt_i$. The network interface $IR_i$ then includes a demultiplexer-multiplexer for separating the voice channels $VR_i$ and $VE_i$ corresponding to the B channel and telephone and teleconference signaling on the D channel.

If the line $LT_i$ is an analog line, the network interface $IR_i$ includes a plurality of telephone signaling detectors for seizing and clearing down the line and various ringing signals, a two-wire/four-wire converter followed by an electrical echo canceller, a modem and/or a system for detecting/generating MF multifrequency code signals for teleconference signaling, connected to the bus BSG, and a PCM coder and a PCM decoder respectively connected to the channels $VR_i$ and $VE_i$.

Signaling specific to the teleconference, also called as a telephone meeting or conference call, including signaling relating to commands entered by the organizer at the terminal TO and requests/responses from participants, which can be received, processed and sent by the conference bridge PCT, are indicated in the applicant's patent EP 0 515 241 and in the paper entitled "De la Réunion Téléphone à la Conférence Téléphone" by Jean-Pierre BLIN and Jean-Pierre LEBLANC, l'écho des RECHERCHES, No. 171, 2nd quarter 1998, pages 13 to 20.

In addition to the above standard signaling, the invention introduces an identifier $ID_{i,k}$ of a participant-contributor $P_{i,k}$ belonging to the group $G_i$ of participants at the terminal $T_i$ into the signals sent by the network interfaces $IR_1$ to $IR_I$, including therefore the network interface $IR_i$ corresponding to the contributor, in order to verify that the identifier transmitted to the other groups is correct.

The audio mixers $MA_1$ to $MA_I$ and the management unit UG provide standard functions.

A mixer $MA_i$ normally adds all the voice signals on the receive channels $VR_1$ to $VR_{i-1}$ and $VR_{i+1}$ to $VR_I$ in order to reproduce at the terminal $T_i$ mixed audio signals representative of the voices of the participants picked up by the terminals remote from the terminal $T_i$. The speech signal received on the channel $VR_i$ is broadcast to all the mixers $MA_1$ to $MA_{i-1}$ and $MA_{i+1}$ to $MA_I$; as an alternative to this, the signal on the channel $VR_i$ can also be mixed in the mixer $MA_i$. In practice, the mixer $MA_i$ processes the signals to be added as a function of reception characteristics of the terminal $T_i$ and can add only signals on channels $VR_1$ to $VR_I$ selected as a function of commands produced via the bus BSG by the management unit UG in response to instructions transmitted by the organizer terminal TO. The mixer $MA_i$ also transmits voice messages in accordance with the invention that are generated by a voicemail service MV under the control of the management unit UG and which momentarily interrupt the mixed audio signals on the channels $VE_1$ to $VE_I$ or is superimposed thereon so that the voices of the participants and a voicemail identifying the contributor are heard at the same time. The voicemail service MV transmits prerecorded messages to the terminals and records coded responses from the participants.

The management unit UG manages telephone calls to the bridge PCT from the terminals $T_1$ to $T_I$ and calls to the terminals from the bridge PCT under the control of the terminal TO or the server SER. The unit UG also manages various steps of a teleconference, including steps preceding the setting up of a teleconference, such as the creation of voice models of the participants in accordance with instructions coming mainly from the organizer terminal TO. In particular, the organizer monitors the progress of a teleconference on the screen of the terminal TO by assigning to each group identities of the participants, a participant code, listener code, absent code, terminal clearing down code, etc., in close collaboration with a data memory of the unit UG that can be interrogated from the terminal TO or the server SER.

As can be seen in FIG. 2, in accordance with the invention, the conference bridge PCT further comprises a line activity detector DA and a group voice analyzer AV each of which can monitor the voice receive channels $VR_1$ to $VR_I$.

The detector DA detects which of the receive channels carrying the voice of the current contributor during a teleconference is the most active channel. The detector DA establishes the address $G_i$ of the most active channel $VR_i$ or the most active transmission link $lt_i$-$LT_i$, i.e. that of the most active group of participants. The address $G_i$ constitutes a portion of the identifier of the contributor and is supplied to the management unit UG and to the analyzer AV.

The voice analyzer AV selects the voice receive channel $VR_i$ corresponding to the most active line address $G_i$ established by the detector DA in order to extract therefrom and analyze a voice segment $SG_i$. A memory MM stores voice models of the participants in a teleconference which are established beforehand and/or at the beginning of a teleconference by the voice analyzer AV under the control of the management unit UG. A voice model $MOD_{i,k}$ is associated with the address $P_{i,k}$ of the kth participant belonging to the group $G_i$, with $1 \leq k \leq K_i$.

During a period T in a teleconference, the analyzer AV compares the voice segment $SG_i$ on the active receive channel $VR_i$ with the voice models $MOD_{i,1}$ to $MOD_{i,Ki}$, as described below, to determine the participant in the active group $G_i$ who has taken the floor, in order to identify him as the contributor at least from the address $P_{i,k}$, consisting for example of his name and forename. The address $P_{i,k}$ of the contributor is associated with the address $G_i$ of his group produced by the detector DA so that the management unit UG can broadcast an identifier $ID_{i,k}[P_{i,k}; G_i]$ to all the other terminals $T_1$ to $T_I$ via the network interfaces $IR_1$ to $IR_I$.

Figure 3:
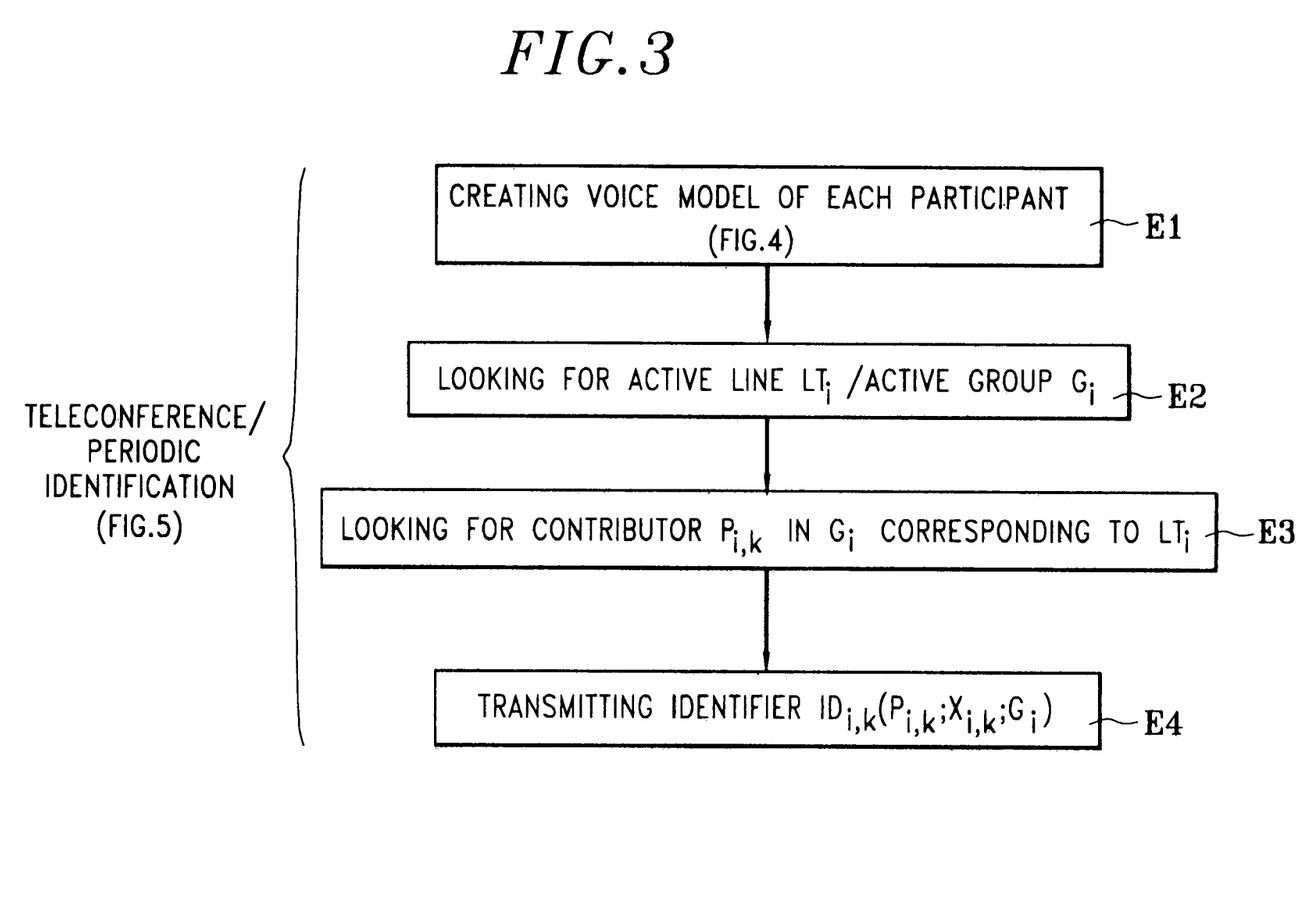
FIG. 3 shows a contributor identification algorithm according to the invention used in the FIG. 1 system.

As shown in FIG. 3, in a preferred embodiment of the invention the contributor identification process includes four main steps E1 to E4 for creating voice models of the participants in a teleconference, looking for an active link, i.e. the group to which a participant, called the contributor, who has taken the floor belongs, looking for the contributor in the active group, and transmitting the identifier of the contributor via the conference bridge PCT to the terminals $T_1$ to $T_I$.

Figure 4:
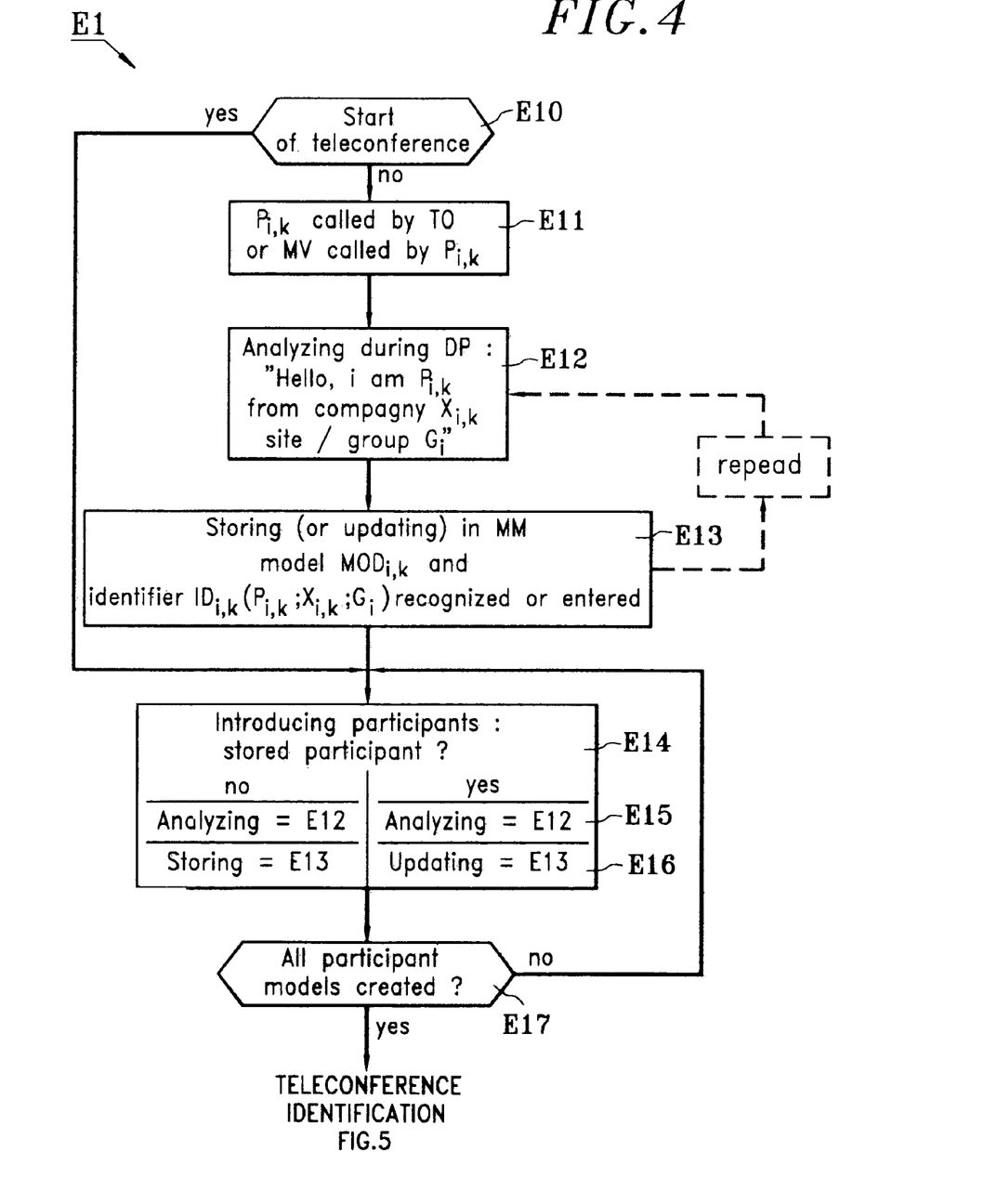
FIG. 4 shows a participant voice model creation algorithm included in the FIG. 3 algorithm.

The voice model of a teleconference participant can be stored off-line, before the teleconference, or at the beginning of the teleconference, as indicated in a first substep E10 of the voice model creation algorithm E1, shown in FIG. 4.

If the voice model must be stored before the teleconference, the organizer terminal TO calls, via the bridge PCT, a participant $P_{i,k}$ situated at any terminal known to the organizer, or the participant $P_{i,k}$ himself calls the voicemail service MV in the bridge PCT from any telephone terminal in substep E11.

In the next substep E12 the organizer or the voicemail server prompts the participant $P_{i,k}$ to speak a freely chosen sentence of the following kind and exceeding a predetermined minimum duration DP:

"Hello, I am the participant $P_{i,k}$ from company $X_{i,k}$, site $G_i$", where $P_{i,k}$ denotes the name and forename of the participant, for example, $X_{i,k}$ is the name of their company and $G_i$ is the name of the site on which terminal $T_i$ is located. A voice model $MOD_{i,k}$ defined by particular characteristics of the voice of the participant $P_{i,k}$ is constructed in the analyzer by applying a predetermined analyzing algorithm to the sentence previously spoken. The voice model $MOD_{i,k}$, also called as an acoustic reference, is stored with the identifier $ID_{i,k}[P_{i,k}; X_{i,k}; G_i]$ of the participant $P_{i,k}$ in the memory MM in substep E13.

In order for the voice model $MOD_{i,k}$ to be used as a reference in subsequent analyses of the periodically segmented voice of the participant, and in particular in order to distinguish that voice from others, the sentence to be spoken must be sufficiently long and has a duration of at least approximately DP=5 s, for example. During this learning period DP, the model is created in the analyzer AV and stored at an address corresponding to the participant $P_{i,k}$ in the memory MM. The telephone call between the participant and the bridge PCT is then cleared down if the teleconference is scheduled for later.

As an alternative to the above, if the analyzer AV is incapable of recognizing one of the parameters $P_{i,k}$, $X_{i,k}$, $G_i$, it reports this to the organizer terminal TO or to the voicemail service MV in order to prompt the participant to repeat the sentence or the parameter that has not been understood, or to prompt the organizer or the participant to enter at the keyboard of his terminal the parameter or the parameters $P_{i,k}$, $X_{i,k}$ and $G_i$ that have not been understood, in order to confirm the spoken sentence.

In substep E13, if the participant $P_{i,k}$ frequently uses the teleconference service with the bridge PCT, he is already listed in the memory MM, the parameters $[P_{i,k}; X_{i,k}; G_i]$ can be recognized by the voice analyzer AV, and the model $MOD_{i,k}$ is updated to guarantee good voice identification performance in the face of the possibility of recent changes to the characteristics of the voice.

Either after substep E10 or after several repetitions of substeps E11 to E13, the organizer initiates the teleconference in substep E14. As a function of the list of teleconference participants displayed on the terminal TO, the organizer prompts at least the participants $P_{i,k}$ for whom no voice model or an old voice model is stored in the bridge PCT to introduce themselves one by one to the other participants, in particular to the other groups of participants, by speaking a sentence of the above kind, and thereby to execute substeps E15 and E16 analogous to substeps E12 and E13. The creation of a voice model for each participant in the analyzer AV is commanded by the organizer from the terminal TO via the unit UG and the voice of the participant $P_{i,k}$ introducing himself is broadcast to the terminals $T_1$ to $T_I$ by appropriate commands sent to the unit UG from the terminal TO.

Creating voice models in substeps E15 and E16 immediately at the beginning of the teleconference improves the voice identification performance of the analyzer AV during the teleconference, compared to creating voice models beforehand in substeps E12 and E13 for the same speaking time used to create the model. The time lapse between the learning phase E15–E16 and the identification step E3 proper, i.e. voice recognition, is very short, which significantly reduces the disruptive effects of changes, gradual changes and aging of the voice of the participant. The learning phase E15–E16 and the identification step E3 proper are effected through the same terminal $T_i$ and the same transmission link $lt_i$-$LT_i$ between the terminal $T_i$ and the bridge PCT, which maintains the same sound pick-up and telephone transmission mode when identifying participants as contributors during the teleconference.

At the beginning of the teleconference, when all the participants have been canvassed and their reference voice models established and stored in the last substep E17, the participants can converse freely, the contributors being identified as the teleconference proceeds in the cyclic steps E2, E3 and E4 described above, respectively comprising substeps E20 to E22, E30 to E36, and E40 and E41.

Hereinafter, referring to FIG. 5, it is assumed that participant $P_{i,k}$ in group $G_i$ at terminal $T_i$ takes the floor. Note that in practice, in the FIG. 5 algorithm used mainly in the activity detector DA and the voice analyzer AV, the result of each of the substeps of determining average power or distance in steps E2 and E3 is the result of a convergence of a plurality of subresults in accordance with predetermined criteria over a period varying from approximately 0.1 s to approximately 5 s, each subresult being evaluated during a subperiod of approximately 10 ms to approximately 20 ms in order to determine within each period T the active group and the contributor therein. The period T is sufficient to analyze voice segments on the receive channels $VR_1$ to $VR_I$ and recognize in them a particular contributor voice.

Figure 5:
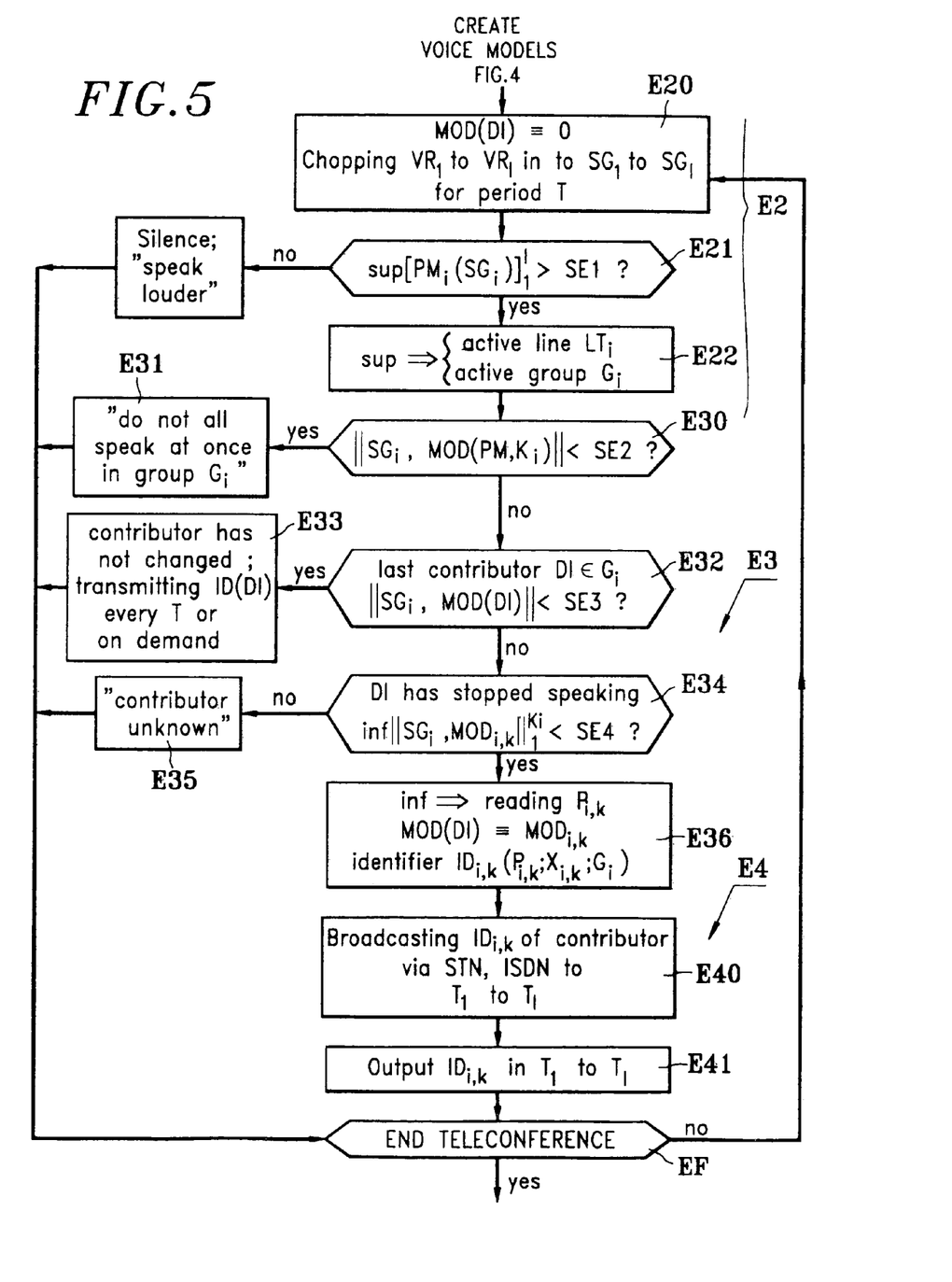
FIG. 5 shows a contributor search and identification algorithm used during a teleconference, included in the FIG. 1 algorithm.

The FIG. 5 algorithm includes a few substeps entailing determining a distance; more generally, determining a distance can be replaced by measuring a similarity or a resemblance between a voice segment and a voice model.

Initially, at the beginning of the conference, a last contributor model MOD(DI) is set to zero.

The search for an active line is based on chopping voice signals on the receive channels $VR_1$ to $VR_I$ into parallel voice segments $SG_1$ to $SG_I$ during each period T, in substep E20. This chopping is effected in the detector DA and the analyzer AV.

The activity detector DA averages the powers $PM_1$ to $PM_I$ of the segments $SG_1$ to $SG_I$ during the period T and determines the maximum average power during the period, provided that it is greater than a first threshold SE1, in substep E21. If the maximum average power is less than SE1, the activity detector DA confirms a "silence" during the teleconference to the management unit UG, which does not broadcast any identifier. The algorithm normally returns to substep E20, via a final substep EF if the teleconference has not finished, or if the identification process in the bridge PCT is not interrupted, in particular by the organizer. If the "silence" continues, or a low level of noise persists, the organizer can intervene to prompt the participants to speak louder, this facility complementing the automatic gain control provided at the end of the links $lt_1$-$LT_1$ to $lt_I$-$LT_I$ between the bridge and the terminals.

In substep E22, the detector AV identifies the receive channel $VR_i$ and therefore the active line $LT_i$ which corresponds to the maximum average power previously determined. The detector AV then supplies the analyzer AV with the name of the active group $G_i$ associated with the active line $LT_i$ as part of the identifier of the contributor. The analyzer and the management unit UG read the voice models $MOD_{i,1}$ to $MOD_{i,Ki}$ of the $K_i$ participants of the group $G_i$ in the memory MM and select the segment $SG_i$ on the receive channel $VR_i$ and analyze it in step E3.

The voice analyzer AV then looks for the contributor $P_{i,k}$ in the active group $G_i$ in substeps E30 to E36 of the main step E3, whose substeps E30 to E33 are optional.

It is preferable if the analyzer first verifies in a substep E30 that it is able to distinguish a participant voice in the voice segment $SG_i$. This verification entails determining the distance between predetermined characteristics of the segment $SG_i$, expressed in the form of vector components, and those of a generic model $MOD(PM,K_i)$ representative of more than one participant taking the floor from the number of participants $K_i$ in the group $G_i$. If the distance $\|SG_i, MOD(PM,K_i)\|$ is less than a predetermined threshold SE2, the segment $SG_i$ contains a plurality of voices of participants from the group $G_i$ who have taken the floor simultaneously during the period T. This indicates a confusion wherein the analyzer AV is incapable of selecting a dominant speaker. In substep E31 the analyzer AV then commands the unit UG to have the voicemail service MV transmit a warning voice message of the type: "Several persons are speaking in group $G_i$," or "Do not all speak at once in group $G_i$,", or the unit UG transmits a displayable message analogous to the voice message, at least on the sending channel $VE_i$. The algorithm then proceeds to step EF.

If the distance determined in substep E30 is greater than the threshold SE2, in substep E32 the analyzer AV verifies that the current contributor who sent the segment $SG_i$ is the same as the contributor during the preceding period T. The analyzer compares the distance between the current segment $SG_i$ and the model MOD(DI) of the last contributor DI, who can belong to any group, including the group $G_i$, to a predetermined threshold SE3 which can be equal to the threshold SE2, knowing that, at the beginning of the teleconference, the distance between the segment $SG_i$ of the first contributor and MOD(DI)=0 is considered to be very much greater than SE2. In another variant, in step E32, the current segment $SG_i$ and the segment $SG_i$ in the preceding period T are compared to detect therein a break in the voice signal indicating a change of speaker; or the above two variants are combined.

If the distance is less than the threshold SE3, the contributor did not change in substep E33. The management unit UG does not need to transmit the identifier of the last contributor again. Nevertheless, the unit UG refreshes the participant memory by periodically broadcasting the identifier of the last contributor to the terminals $T_1$ to $T_I$, for example approximately every P=5 seconds, or as long as said last contributor is speaking.

In a variant of substep E33, the unit UG transmits the identifier of the latter contributor only to participants whose terminals have sent a request for contributor identification transmission by means of a dedicated code entered via the terminal keyboard. This variant enables a participant whose attention has been distracted or who has been absent momentarily to find out the identity of the last contributor, especially if the contribution of the last contributor is particularly long.

If the last contributor DI has stopped speaking in substep E32, the analyzer AV determines in the next substep E34 the distances between the segment $SG_i$ and the models $MOD_{i,1}$ to $MOD_{i,Ki}$ of the $K_i$ participants in the active group $G_i$ designated by the detector DA in substep E22. The analyzer AV compares the smallest of these distances with a predetermined threshold SE4, which can be equal to the threshold SE3 or SE2. If the smallest distance $\|SG_i, MOD_{i,k}\|$ is greater than SE4, with k∈[1, $K_i$], the analyzer AV commands the management unit UG to broadcast a voice message via the voicemail service MV or a "contributor unknown" displayable message via the interface $IR_i$ in substep E35, the algorithm then proceeding to step EF.

On the other hand, if the aforementioned shortest distance is less than SE4, i.e. if the segment $SG_i$ has some similarity or consistency with the model $MOD_{i,k}$, in substep E36 the analyzer reads in the memory MM the designation $P_{i,k}$ of the corresponding participant, possibly accompanied by other parameters such as the company name $X_{i,k}$, thereby supplying them to the management unit UG which associates them with the parameter $G_i$ to constitute the identifier $ID_{i,k}$.

During substep E36, the management unit UG, having received the parameters $G_i$ from the detector DV and $P_{i,k}$ and $X_{i,k}$ from the analyzer AV, composes a voice or visual message containing the identifier $ID_{i,k}$ [$P_{i,k}$; $X_{i,k}$; $G_i$].

As a general rule, this message is broadcast to all the terminals $T_1$ to $T_I$ via the corresponding network interfaces in substep E40. Like the other teleconference messages established by the management unit UG in substeps E31, E33 and E35, this message is transmitted:

either in the form of a digital signal cutting off voice signals on the corresponding sending channels $VE_1$ to $VE_I$ in order to be reproduced in substep E41 by individual headphones or loudspeakers and/or common loudspeakers in the terminals, or in the form of a visual signal by digital or frequency division multiplexing as a function of the transmission mode of the network ISDN or STN in order to be displayed at the terminals in substep E41, for example on the displays of telephones or mobile telephones or on the screens of terminals; the visual messages are expressed in alphanumeric characters with or without symbols; for example, a question mark signifies "Contributor unknown" in substep E35.

These messages are also transmitted by the bridge PCT to the terminal TO=$T_1$ so that the organizer can monitor and direct the teleconference; the identifiers guarantee the identity of the participant, for example in the event of a vote, which excludes any falsification of identity during the teleconference. These messages are also transmitted to the conference server SER to establish statistics, especially on the times for which each participant or each group speaks.

If the transmission network is an ISDN, the displayable teleconference messages, such as those containing an identifier, established by the unit UG are preferably included in user to user signaling transferred over the D channel. The displayable messages are therefore included in user information messages exchanged between users, in this instance the conference bridge PCT and a terminal $T_i$, and conveying up to 128 payload bytes.

If the transmission network is an analog STN, the displayable teleconference messages, such as those containing an identifier, are analogous to the calling party name parameter, corresponding to 07h in the ETSI standard ETS 300 659-1, used to identify the calling party when a call is offered to the called terminal. According to the invention, the displayable messages are sent by the conference bridge to the terminals in the form of parameters not yet used by the standards, such as parameters F1h to FFh of the previously mentioned ETSI standard. In off-hook mode these parameters are transmitted by means of modems included in the network interfaces $IR_1$ to $IR_I$, for example by phase-coherent frequency modulation in accordance with ITU-T Recommendation V.23.

As an alternative to this, the voice or visual message containing the contributor identifier $ID_{i,k}$ is transmitted to only predetermined terminals, at their request, in substep E40. Each terminal that wishes to know the identity of the contributor transmits a contributor identity request message, for example after a dedicated code is entered on the keyboard, as already indicated as a variant for substep E33. The request messages are written in the memory of the management unit UG in a manner that depends on the address of the corresponding terminals. The unit UG reads the request messages in each period T to supply the contributor identifying voice or visual message only to the interface-mixer combinations $IR_1$-$MA_1$ to $IR_I$-$MA_I$ corresponding to the corresponding terminals.

Although the invention is described above in relation to a conference bridge at a great distance from the terminals, it is not limited to that embodiment but encompasses other distributions of the terminals and the functions included in the conference bridge. For example, the conference bridge is a peripheral of a private automatic branch exchange (PABX) serving the terminals. In another example, the functions of the conference bridge are included in the organizer terminal TO, i.e. in one $T_1$=TO of the terminals. Depending on the connections, including mobile radio telephone connections, to the entity including the functions of the conference bridge according to the invention, the network interfaces $IR_1$ to $IR_I$ can be combined into a single interface connected to a single analog or digital transmission link on which the channels $VR_j$ to $VR_1$ and $VE_1$ to $VE_I$ are frequency-division or time-division multiplexed.

In the case of the minimum configuration with one group $G_1$ with one participant $P_{1,1}$ and one group $G_2$ with two participants $P_{2,1}$ and $P_{2,2}$, the functions of the conference bridge according to the invention are preferably included in the terminal $T_1$, which enables the participant $P_{1,1}$ to distinguish the voice of the participant $P_{2,1}$, such as the regular user of the terminal $T_2$, for example a mobile radio telephone, from an occasional user $P_{2,2}$ of the terminal $T_2$.

We claim:

1. A method of identifying a contributor among participants divided into groups at telephone terminals during a teleconference managed by means of a conference device connected to said terminals via transmission links, each transmission link having a receive channel and a transmit channel, said method comprising:

identifying the voice of said contributor in said conference device, said identifying step including the steps of:
looking for the most active receive link channel,
identifying the group corresponding to said most active receive link channel,
determining the greatest similarity between a voice segment on said most active receive link channel and voice models of the participants in said identified group, and
identifying as said contributor the participant corresponding to said greatest determined similarity, and
after the step of identifying the voice of said contributor received over said receive link channels by said conference device:
broadcasting an identifier of said identified contributor over said transmit link channels from said conference device to said terminals, and
reproducing said identifier of said contributor at said terminals.

2. A method according to claim 1, wherein said identifier of said contributor includes at least a name of said contributor, complemented by at least one designation of the group to which said contributor belongs.

3. A method according to claim 1, wherein said identifier of said contributor is obtained by speech recognition in said conference device.

4. A method according to claim 1, wherein said identifier is broadcast only to terminals having sent identifier requests to said conference device.

5. A method according to claim 1, wherein said identifier of said contributor is broadcast in the form of a voice message with participant voice signals on said transmit link channels and is reproduced acoustically by said terminals.

6. A method according to claim 1, wherein said identifier of said contributor is broadcast in the form of a signaling message on said transmit link channel and is reproduced visually in said terminals.

7. A method according to claim 1, wherein said conference device is included in one of said terminals.

8. A method according to claim 1, wherein said conference device is included in a private telephone exchange serving said terminals.

9. A method according to claim 1, wherein the step of looking for said most active receive link channel includes looking for the largest average power of voice segments on said receive link channels, provided that said largest average power is greater than a predetermined threshold.

10. A method according to claim 1, wherein said participant corresponding to said greatest determined similarity is not identified and an unknown-contributor message is broadcast to said terminals if said greatest determined similarity is less than a predetermined threshold.

11. A method according to claim 1, further including creating and updating said voice models of said participants in said conference device not later than the beginning of said teleconference, said voice models being the result of voice analysis of a model sentence exceeding a predetermined minimum duration.

12. A method according to claim 1, including a step of determining the similarity between the voice segment on said most active receive link channel and a voice model representative of more than one participant taking said floor and specific to said number of participants in said identified group, and broadcasting from said conference device a start-of-multiple-speaking message to said terminals if said determined similarity is greater than a predetermined threshold.

13. A method according to claim 1, including a step of determining the similarity between the voice signal on said most active receive link channel and the voice model of a last contributor and broadcasting the identifier of said last contributor from said conference device only to terminals having sent identifier requests to said conference device in response to the determined similarity between the voice signal on said most active receive link channel and the voice model of the last contributor being greater than a predetermined threshold.

14. A conference device adapted to be connected to telephone terminals via transmission links each having a receive channel and a transmit channel to manage a teleconference between participants divided into groups at terminals, said conference device comprising means for periodically detecting the most active receive link channel in order to identify the group corresponding to said most active receive link channel, means for periodically comparing a voice segment on said most active receive link channel with stored voice models of said participants belonging to said identified group in order to identify as said contributor a participant corresponding to the greatest similarity between said voice segment and said voice models, means for deriving an identifier of said identified contributor, and means for broadcasting said contributor identifier over said transmit link channels to said terminals.

15. A conference device adapted to be connected to telephone terminals via transmission links each having a receive channel and a transmit channel to manage a teleconference between participants divided into groups at terminals, said conference device comprising a detector for periodically detecting the most active receive link channel in order to identify the group corresponding to said most active receive link channel, a comparator for periodically comparing a voice segment on said most active receive link channel with stored voice models of said participants belonging to said identified group in order to identify as said contributor a participant corresponding to the greatest similarity between said voice segment and said voice models, a signal source for deriving an identifier of said identified contributor, and a transmitter for broadcasting said contributor identifier over said transmit link channels to said terminals.

* * * * *